US010109020B2

(12) United States Patent
Deeter et al.

(10) Patent No.: US 10,109,020 B2
(45) Date of Patent: Oct. 23, 2018

(54) USER INTERFACE FOR BOOKMARKS IN A SOCIAL NETWORKING SYSTEM

(71) Applicant: Facebook, Inc., Menlo Park, CA (US)

(72) Inventors: Ken Taro Deeter, San Carlos, CA (US); Tom Stocky, Los Altos, CA (US); Robyn D. Morris, San Francisco, CA (US)

(73) Assignee: Facebook, Inc., Menlo Park, CA (US)

( * ) Notice: Subject to any disclaimer, the term of this patent is extended or adjusted under 35 U.S.C. 154(b) by 663 days.

(21) Appl. No.: 13/748,112

(22) Filed: Jan. 23, 2013

(65) Prior Publication Data
US 2014/0208233 A1  Jul. 24, 2014

(51) Int. Cl.
*G06F 3/048* (2013.01)
*G06Q 50/00* (2012.01)
*G06F 3/0488* (2013.01)

(52) U.S. Cl.
CPC ........... *G06Q 50/01* (2013.01); *G06F 3/0488* (2013.01); *G06F 2203/04803* (2013.01)

(58) Field of Classification Search
None
See application file for complete search history.

(56) References Cited

U.S. PATENT DOCUMENTS

| 6,460,038 | B1* | 10/2002 | Khan | G06F 17/30884 |
| 2003/0009496 | A1* | 1/2003 | McBrearty | G06F 17/30884 |
| | | | | 715/206 |
| 2006/0047620 | A1* | 3/2006 | Branson | G06F 17/30067 |
| 2007/0033169 | A1* | 2/2007 | Friedman | G06F 17/30551 |
| 2008/0263473 | A1* | 10/2008 | Becker | G06F 17/30873 |
| | | | | 715/781 |
| 2009/0054091 | A1* | 2/2009 | van Wijk | H04L 67/24 |
| | | | | 455/466 |
| 2009/0204481 | A1* | 8/2009 | Navar | G06Q 30/02 |
| | | | | 725/14 |
| 2010/0223561 | A1* | 9/2010 | Martin | G06F 3/048 |
| | | | | 715/752 |
| 2011/0157029 | A1* | 6/2011 | Tseng | G06F 3/04883 |
| | | | | 345/173 |
| 2011/0208822 | A1* | 8/2011 | Rathod | G06Q 30/02 |
| | | | | 709/206 |

(Continued)

OTHER PUBLICATIONS

"Yelp updates iPhone, iPad and Web apps, overhauls business pages, adds "pull to view" tweaks and more," Jul. 27, 2012. 8 pages.*

*Primary Examiner* — Kevin L Young
*Assistant Examiner* — Haimei Jiang
(74) *Attorney, Agent, or Firm* — Fenwick & West LLP

(57) ABSTRACT

A bookmark displays one or more bookmark tiles each linked to an object in a social networking system, allowing faster and easier access to the linked objects. The bookmark tiles are arranged in a tile region displayed proximate to a page of content from the social networking system. For example, the tile region is a horizontal row proximate to the page content. The tile region may be accessed by performing a scrolling input when the page is displayed by a client device. The bookmark tiles may be navigated using a search region for receiving input to search the bookmark tiles. The search region may be accessible by performing a second scrolling input while the client device displays the page.

16 Claims, 5 Drawing Sheets

(56) References Cited

U.S. PATENT DOCUMENTS

| | | | | |
|---|---|---|---|---|
| 2011/0276396 A1* | 11/2011 | Rathod | G06F 17/30867 | 705/14.49 |
| 2012/0216101 A1* | 8/2012 | Yonemoto | G06F 17/30035 | 715/206 |
| 2012/0297318 A1* | 11/2012 | Amrhein | G06F 17/30873 | 715/753 |
| 2012/0311509 A1* | 12/2012 | Maggiotto | G06F 3/04817 | 715/863 |
| 2013/0055083 A1* | 2/2013 | Fino | G06F 3/0485 | 715/716 |
| 2013/0111356 A1* | 5/2013 | Vasudevan | G06F 3/04817 | 715/753 |
| 2013/0159314 A1* | 6/2013 | Kao | G06F 17/30884 | 707/740 |
| 2013/0198321 A1* | 8/2013 | Martin | G06F 17/30038 | 709/217 |
| 2013/0215040 A1* | 8/2013 | Bose | G06F 3/0416 | 345/173 |
| 2013/0246970 A1* | 9/2013 | Helle | G06F 3/0482 | 715/822 |
| 2013/0298006 A1* | 11/2013 | Good | G06Q 10/107 | 715/234 |
| 2014/0173399 A1* | 6/2014 | Sorg | G06Q 50/01 | 715/206 |
| 2014/0189592 A1* | 7/2014 | Benchenaa | G06F 3/04886 | 715/835 |
| 2014/0201673 A1* | 7/2014 | Dunn | G06F 3/0481 | 715/781 |

\* cited by examiner

USER INTERFACE FOR BOOKMARKS IN A SOCIAL NETWORKING SYSTEM

BACKGROUND

This invention relates generally to bookmarks for objects in a social networking system, and in particular to a user interface for the bookmarks.

Social networking systems include various objects to which its users may connect. Examples of objects include interactive applications, groups of users, or common interest pages. As users become connected to an increasing number of objects, it becomes more difficult for users to easily access objects to which they are connected. While social networking systems may maintain bookmarks linked to objects, allowing a user to interact with a bookmark to access an object, displaying bookmarks reduces the display space available for presentation of social networking system content. Hence, displaying large numbers of bookmarks may make it more difficult for users to view and interact with new social networking system content.

SUMMARY

Bookmarks linking to objects in a social networking system are displayed as bookmark tiles in a user interface. The bookmark tiles are arranged within a tile region that is displayed proximate to content from the social networking system. For example, the tile region is horizontal row displayed proximate to a top or bottom of the displayed social networking system content. In one embodiment, the tile region is not displayed until a first input is detected. For example, when the social networking system content is displayed and an input to scroll through the social networking system content is received, the tile region is displayed. In one embodiment, subsequently performing a second input, such as a second input to scroll through the social networking content, displays a search region along with the social networking content. The search region includes a search box for receiving input to identify bookmark tiles for presentation in the tile region.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Architecture

Figure 1A:
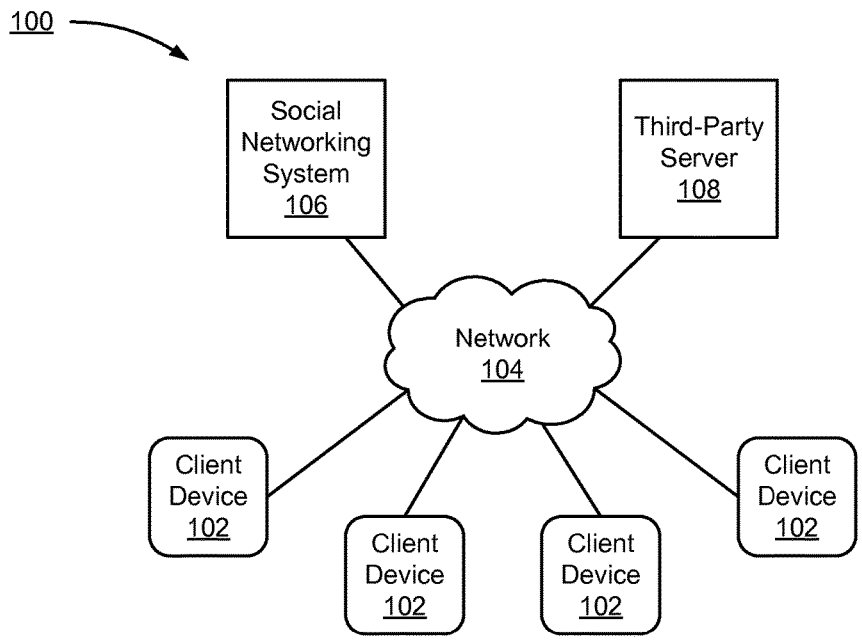
FIG. 1A is a block diagram of a system environment for a social networking system, according to one embodiment.

FIG. 1A is a block diagram of one embodiment of a system environment 100 for a social networking system 106. The system environment 100 comprises one or more client devices 102, a network 104, the social networking system 106, and one or more third-party severs 108. In alternative configurations, different and/or additional components may be included in the system environment 100. The embodiments described herein can also be adapted to online systems that are not social networking systems.

The client devices 102 comprise one or more computing devices capable of receiving user input as well as transmitting and/or receiving data via the network 104. In one embodiment, a client device 102 is a conventional computer system, such as a desktop or laptop computer. In another embodiment, a client device 102 may be a device having computer functionality, such as a personal digital assistant (PDA), mobile telephone, smart-phone or similar device. A client device 102 is configured to communicate via the network 104. Each client device 102 executes an application allowing a user of the client device 102 to interact with the social networking system 106. Two example embodiments of client devices are described in detail with reference to FIGS. 1C and 1D.

Each user may use several different client devices 102 to interact with the social networking system 106. For example, a user may use a desktop computer to interact with the social networking system 106 at home and a smart-phone to interact with the social networking system 106 while traveling. In addition, multiple users may use the same client device 102 to interact with the social networking system 106.

A social networking system user may use several different client devices 102 to interact with the social networking system 106. For example, a user may use a desktop computer to interact with the social networking system 106 at home and a smart-phone to interact with the social networking system while traveling. In addition, multiple users may use the same client device 102 to interact with the social networking system 106.

The client devices 102 are configured to communicate via the network 104, which may comprise any combination of local area and/or wide area networks, using both wired and wireless communication systems. In one embodiment, the network 104 uses standard communications technologies and/or protocols. Thus, the network 104 may include communication links using technologies such as Ethernet, 802.11, worldwide interoperability for microwave access (WiMAX), 3G, 4G, CDMA, digital subscriber line (DSL), etc. Similarly, the networking protocols used on the network 104 may include multiprotocol label switching (MPLS), transmission control protocol/Internet protocol (TCP/IP), User Datagram Protocol (UDP), hypertext transport protocol (HTTP), simple mail transfer protocol (SMTP) and file transfer protocol (FTP). Data exchanged over the network 104 may be represented using technologies and/or formats including hypertext markup language (HTML) or extensible markup language (XML). In addition, all or some of the communication links can be encrypted using conventional encryption technologies such as secure sockets layer (SSL), transport layer security (TLS), and Internet Protocol security (IPsec). The third party server 108 may be coupled to the network 104 for communicating with the social networking system 106, which is further described below in conjunction with FIG. 1B.

Figure 1B:
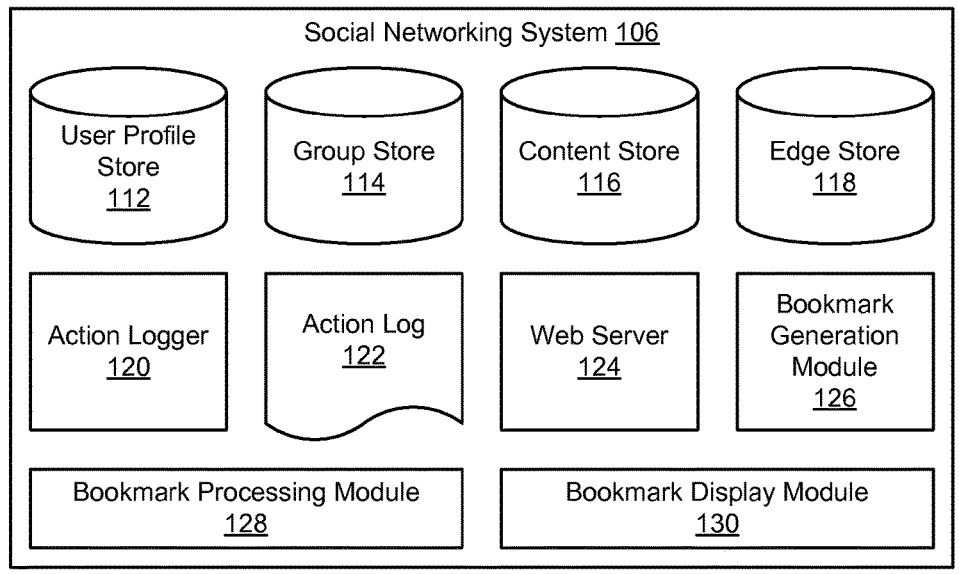
FIG. 1B is a block diagram of an architecture of the social networking system, according to one embodiment.

FIG. 1B is one embodiment of an architecture of the social networking system 106. In the embodiment shown by FIG. 1B, the social networking system 106 includes a user profile store 112, a group store 114, a content store 116, an edge store 118, an action logger 120, an action log 122, a web server 124, a display generation module 126, a bookmark generation module 128, and a bookmark ordering module 130. In other embodiments, the social networking system 100 may include additional, fewer, or different components for various applications. Conventional components such as network interfaces, security functions, load balancers, failover servers, management and network operations consoles, and the like are not shown so as to not obscure the details of the system architecture.

Each user of the social networking system 106 is associated with a user profile, which is stored in the user profile store 112. A user profile includes declarative information about the user that was explicitly provided by the user, and may also include information inferred by the social networking system 106. In one embodiment, a user profile includes multiple data fields, with each data field describing one or more attributes of the corresponding user of the social networking system 106. Examples of information stored in a user profile includes biographic, demographic, and other types of descriptive information, such as work experience, educational history, gender, hobbies or preferences, location and the like. A user profile may also store other information provided by the user, for example, images or videos. In certain embodiments, images of users may be tagged with identification information of users of the social networking system 106 displayed in an image. A user profile in the user profile store 112 may also maintain references to actions by the corresponding user performed on content items in the content store 116 and stored in the action log 122 and references to connections to other users maintained by the edge store 118.

While user profiles in the user profile store 112 are frequently associated with individuals, allowing people to interact with each other via the social networking system 106, user profiles may also be stored for entities such as businesses or organizations. This allows an entity to establish a presence on the social networking system 106 for connecting and exchanging content with other social networking system users. The entity may post information about itself, about its products or provide other information to users of the social networking system 106 using a brand page associated with the entity's user profile. Other users of the social networking system 106 may connect to the brand page to receive information posted to the brand page or to receive information from the brand page. A user profile associated with the brand page may include information about the entity itself, providing users with background or informational data about the entity associated with the brand page.

A user profile may also store a user profile list that defines a list of other user profiles. The user profile list can be created and updated by the user or automatically created and updated by the social networking system 106. For example, a user creates and updates a list of user profiles belonging to the user's close friends, family members, or co-workers. In another example, the social networking system 106 automatically creates and updates a list of users that attended the same university as the user. A user profile list may be used to identify content items associated with users on the user profile list for presentation to the user, allows the user to more easily interact with the users on the user profile list.

Users and other entities may join groups, and information about the groups is stored in the group store 114. A group includes a plurality of users having one or more common interests. Additionally, a group may be associated with a page or other communication channel where users in the group may share content related to the one or more common interests. For example, users may belong to a group about rabbits in which the users share content about caring for and playing with pet rabbits. Information about a group maintained by the group store 114 includes, a name for the group, a description of the group, and settings regulating joining the group or editing information associated with the group.

The content store 116 stores objects representing various types of content. Examples of content represented by an object include a page post, a status update, a photo, a video, a link, a shared content item, a gaming application achievement, a check-in event at a local business, a brand page, or any other type of content. Objects may be created by users of the social networking system 106, such as status updates, photos, events, groups or applications. In some embodiments, objects are received from third-party applications, which may be separate from the social networking system 106. Content "items" represent single pieces of content that are presented to social networking system users. Presenting content items to users increases user interaction with the social networking system 106 by encouraging users to post content items for presentation, increasing the interaction of users with each other and increasing the frequency with which users interact within the social networking system 106.

The edge store 118 stores information describing connections between user profiles and other objects on the social networking system 106 as edges. Some edges may be defined by users, allowing users to specify their relationships with other users by generating edges between their user profiles with the user profiles of the other users. For example, users may generate edges with other user profiles that parallel the users' real-life relationships, such as friends, co-workers, partners, and so forth. Other edges are generated when users interact with objects in the social networking system 100, such as expressing interest in a page on the social networking system 106, becoming a member of a group, sharing a link with other users of the social networking system 106, and commenting on posts made by other users of the social networking system 106.

The edge store 118 includes information describing an edge, such as affinity values for objects, groups, interests, and other user profiles. Affinity values may be computed by the social networking system 106 over time to approximate a user's affinity for an object, group, interest, and other user profiles in the social networking system 106 based on the actions performed by the user. Computation of affinity is further described in U.S. patent application Ser. No. 12/978, 265, filed on Dec. 23, 2010, which is hereby incorporated by reference in its entirety. In one embodiment, multiple interactions between a user and a specific object may be stored as a single edge in the edge store 118; alternatively, each interaction is stored as a separate edge. In some embodiments, connections between user profiles may be stored in the user profile store 112, or the user profile store 112 may access the edge store 118 to determine connections between user profiles.

The action logger 120 receives communications about user actions on and/or off the social networking system 106 and populates the action log 122 with information describing these actions. Examples of actions include adding a connection to another user, sending a message to another user, uploading an image, reading a message from another user, viewing content associated with another user, attending an event posted by another user, among others.

The social networking system 106 uses the action log 122 to track user actions on the social networking system 106, as well as on external websites that communicate information to the social networking system 106. Users may interact with various objects on the social networking system 106, including commenting on posts, sharing links, and checking-in to physical locations via a mobile device, accessing content items or other interactions. Information describing these actions is stored in the action log 122. Additional examples of interactions with objects on the social networking system 106 included in the action log 122 include commenting on a photo album, communications between users, becoming a fan of a musician, adding an event to a calendar, joining a group, becoming a fan of a brand page, creating an event, authorizing an application, using an application and engaging in a transaction. Additionally, the action log 122 records a user's interactions with advertisements on the social networking system 106 as well as other applications operating on the social networking system 100. In some embodiments, each entry in the action log 122 also includes an identifier for the client device 102 that was used to perform the action. In some embodiments, data from the action log 122 is used to infer interests or preferences of the user, augmenting the interests included in the user profile and allowing a more complete understanding of user preferences.

The action log 122 may also store user actions taken on external websites. For example, an e-commerce website that primarily sells sporting equipment at bargain prices may recognize a user of a social networking system 106 through social plug-ins that enable the e-commerce website to identify the user of the social networking system 106. Because users of the social networking system 106 are uniquely identifiable, third party servers 104, such as this sporting equipment retailer, may use the information about social networking system users accessing content from a third party server 104. The action log 122 records data about these users, including webpage viewing histories, advertisements that were engaged, purchases made, and other patterns from shopping and buying.

Data maintained by the user profile store 112, the group store 114, the content store 116, the edge store 118, and the action log 122 are collectively referred to as a "social graph." At a high level, the user profiles, groups, and content items form nodes in the social graph, and edges connect the nodes. Edges between nodes may be based on connections described in the edge store 118 or actions stored in the action log 122. In some embodiments, the social graph includes additional types of nodes and edges that are not explicitly described above with reference to the user profile store 112, the group store 114, the content store 116, the edge store 118, and the action log 122.

The web server 124 links the social networking system 106 via the network 104 to the one or more client devices 102, as well as to the one or more third party servers 108. The web server 124 serves web pages, as well as other web-related content, such as JAVA®, FLASH®, XML and so forth. The web server 124 may receive and route messages between the social networking system 106 and client devices 102, for example, instant messages, queued messages (e.g., email), text and SMS (short message service) messages, or messages sent using any other suitable messaging technique. A user may send a request to the web server 124 to upload information, for example, profile information to be stored in the user profile store 112, images or videos to be stored in the content store 116, or requests to generate new edges to connect with user profiles, groups, or content items. Additionally, the web server 124 may provide API functionality to send data directly to native client device operating systems, such as IOS®, ANDROID™, WEBOS® or RIM.

The bookmark generation module 126 generates bookmarks for a user. A bookmark is data including a link to an object in the social networking system 106. The object to which a bookmark includes a link may be any node on the social graph that can be displayed to the user, such as a content item, a user profile or a group. The object to which a bookmark links may be any content presented by the social networking system 106, such as a page, an application, or a filtered news feed. A bookmark may also include a link to search query saved by a user, as described in U.S. patent application Ser. No. 13/729,954, filed on Dec. 28, 2012, which is incorporated by reference herein in its entirety.

The bookmark generation module 126 generates a bookmark for a user based on the user's activity. For example, the bookmark generation module 126 may automatically create and store a bookmark linking to an object when the user first interacts with the object (e.g., by joining a group or using an application for the first time). Additionally, a user may send a request to the bookmark generation module 126 identifying an object and the bookmark creates data a link to the object identified by the request. After creating a bookmark for a user, the bookmark generation module 126 stores the bookmark in the user's user profile in the user profile store 112.

The bookmark processing module 128 receives bookmarks stored in a user profile and selects a subset of the bookmarks to be presented to the user. In one embodiment, the bookmark processing module 128 also determines the order in which the selected subset of bookmarks are presented. In other embodiments, the bookmark processing module 128 determines an ordering of the bookmarks stored in a user profile without selecting a subset of bookmarks, so all of the stored bookmarks may be displayed using the determined ordering. In one embodiment, the bookmark processing module 128 selects and/or orders the bookmarks based on data in one or more of the action log 122, the edge store 118, and the user profile store 112. Selection and ordering of bookmarks is further described in U.S. patent application Ser. No. 13/720,724, filed on Dec. 19, 2012, which is incorporated by reference herein in its entirety.

The bookmark display module 130 receives a selection and/or ordering of bookmarks from the bookmark processing module 128 and generates a visual representation of the bookmarks for presentation to the user. In one embodiment, which is further described below in conjunction with FIGS. 2 and 3A-3D, the bookmark display module 130 formats the bookmarks as a horizontal row of bookmark tiles. Alternatively, the bookmark display module 130 formats the bookmarks as a vertical list. Although the bookmark display module 130 is shown in FIG. 1B as part of the social networking system 106, some or all of the functionality of the bookmark display module 130 may alternatively be performed on a client device 102, as described below with reference to FIG. 1D.

Figure 1C:
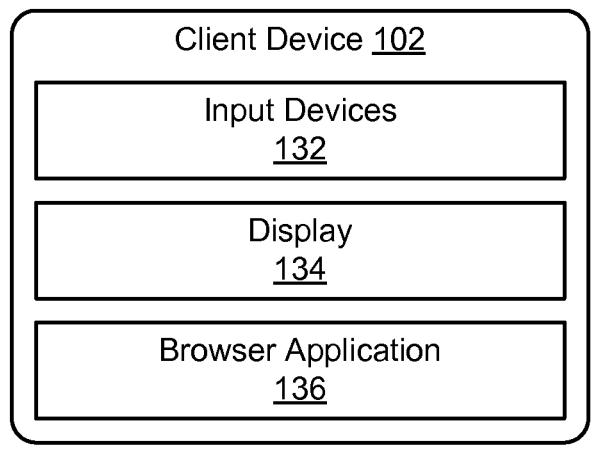
FIG. 1C is a block diagram of an architecture of a client device, according to one embodiment.

FIG. 1C is a block diagram of one embodiment of an architecture of a client device 102. In the embodiment shown in FIG. 1C, the client device 102 includes input devices 132, a display 134, and a browser application 136. The client device 102 may also include additional components that are common to computing devices, such as a processor for executing computer program code, a non-transitory storage medium for storing program code and data (including program code and data for the browser application 136), and networking hardware interfacing with the network 104 to exchange data with the social networking system 106.

The input devices 132 are hardware devices configured to receive interactions from a user. Examples of an input device 132 include a touch-sensitive surface (e.g., a touchscreen or trackpad), a mouse, a keyboard, or a microphone. The display 134 is a hardware device that provides visual output to the user. For example, the display 134 may be a display device (e.g., a liquid crystal display (LCD) screen) integrated into the client device 102.

The client device 102 executes the browser application 136 to exchange information between the client device 102 and the social networking system 106 via the network 104. The browser application 136 receives web pages or other content from remotely-connected web-servers (e.g., the web server 124 of the social networking system 106) and displays the web pages or other content to the user. For example, to interact with the social networking system 106, the client device 102 executes the browser application 136 and communicates a command received from a user (e.g., a uniform resource locator (URL) for the social networking system 106 or selection of a link to the social networking system 106) to the social networking system 106.

Figure 1D:
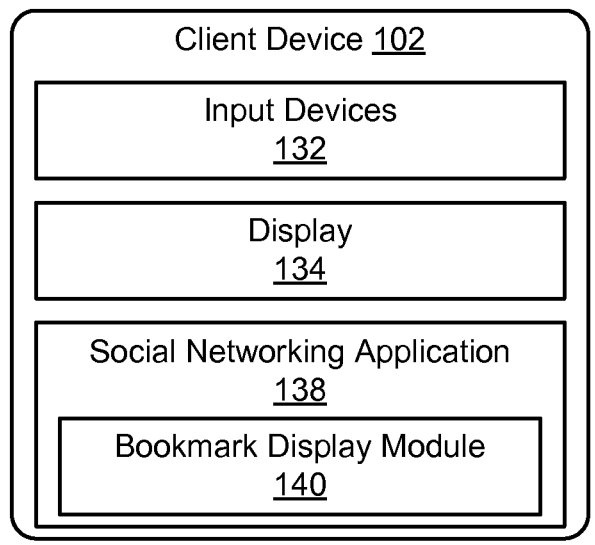
FIG. 1D is a block diagram of an architecture of a client device, according to another embodiment.

FIG. 1D is a block diagram of one embodiment of an alternative architecture of a client device 102. Similar to the client device shown in FIG. 1C, the client device shown in FIG. 1D includes an input device 132 and a display 134. The client device 102 of FIG. 1D also includes a social networking application 138 running on a native operating system of the client device 102 (e.g., IOS® or ANDROID™). Similar to the browser application 138 of the embodiment shown in FIG. 1C, the social networking application 136 communicates information between the client device 102 and the social networking system 106. However, because the social networking application 138 executes natively on the client device 102, the social networking application 138 may provide additional functionality than the browser application 136. For example, the social networking application 138 includes a client-side bookmark display module 140 that performs some or all of the bookmark formatting functions described above with reference to the bookmark display module 130 and further described below with reference to FIGS. 2 and 3A-3D.

User Interface for Bookmarks

Figure 2:
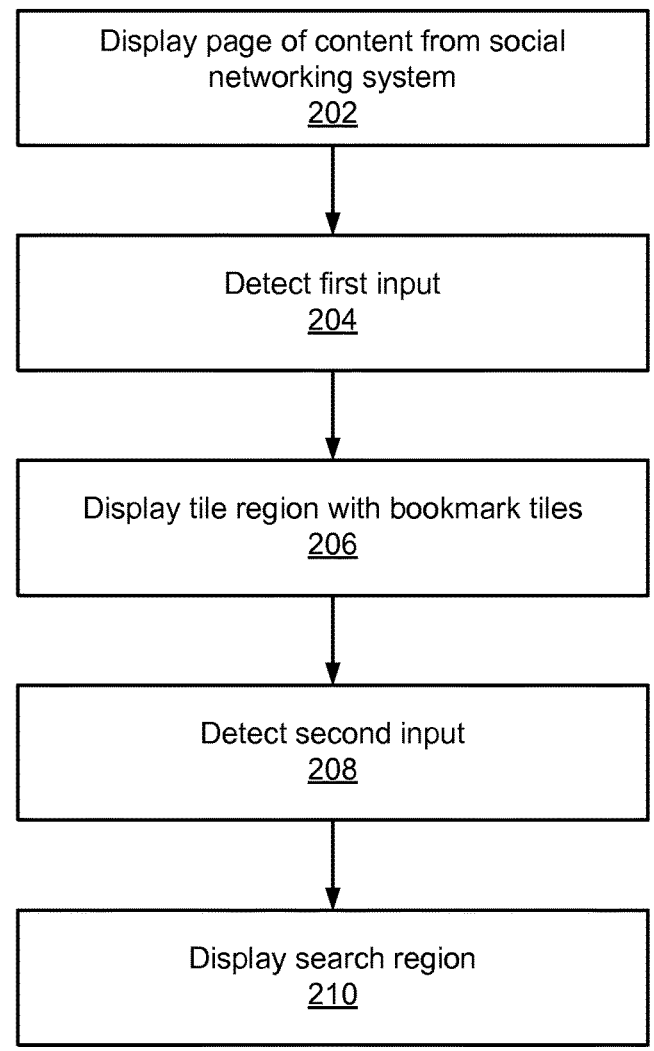
FIG. 2 is a flow chart of a process for interacting with a user interface to access bookmarks, according to one embodiment.

FIG. 2 is a flow chart illustrating one embodiment of a process 200 for interacting with bookmarks via a user interface accessing various user interface features for bookmarks. For ease of discussion, the process shown in FIG. 2 will be described below in conjunction with the screenshots shown in FIGS. 3A-3D. While FIG. 2 refers to specific components of the client device 102 and the social networking system 106, in various embodiments the functions performed by the referenced components may be performed by different components in the system environment 100. For example, any user interface features (e.g., a tile region and a search region) generated by the client-side bookmark display module 140 may alternatively be generated by the bookmark display module 130 on the social networking system 106 and sent to a client device 102 for display by a browser application 136.

The client device 102 displays 202 content received from the social networking system 106. For example, the client device 102 displays a page received from the social networking system 106. In the example shown in FIG. 3A, the page 302 is a user profile page including content items associated with the profile, either by the user associated with the profile or by other users. As other examples, the page 302 may be a page for a group, a brand page, a news feed, an application, or any other information retrieved from the social networking system 106. In one embodiment, the web server 124 on the social networking system 106 retrieves the content items for a requested page and generates the page, which is sent to the client device 102 for display via a browser application 136 or a social networking application 128. In another embodiment, the content items associated the page are sent to the client device 102, and the social networking application 138 generates and renders the page from the content items.

After the page is displayed 202 to the user, an input device 132 of the client device 102 detects 204 a first input from the user with the page 302. In one embodiment, an input device 132 detects 204 a first scrolling input with the page 302. For example, the first input corresponds to an action that scrolls a page downward in the display 134. For example, the first input is a scrolling input that is a downward swiping gesture 304 on a touchscreen, as shown in the example screenshot of FIG. 3A. In another example, the user may use a mouse to perform the first input by rotating the scroll wheel in a downward direction, by interacting with a user interface element, such as a scroll bar, or performing a downward swiping gesture on a touchpad.

Figure 3B:
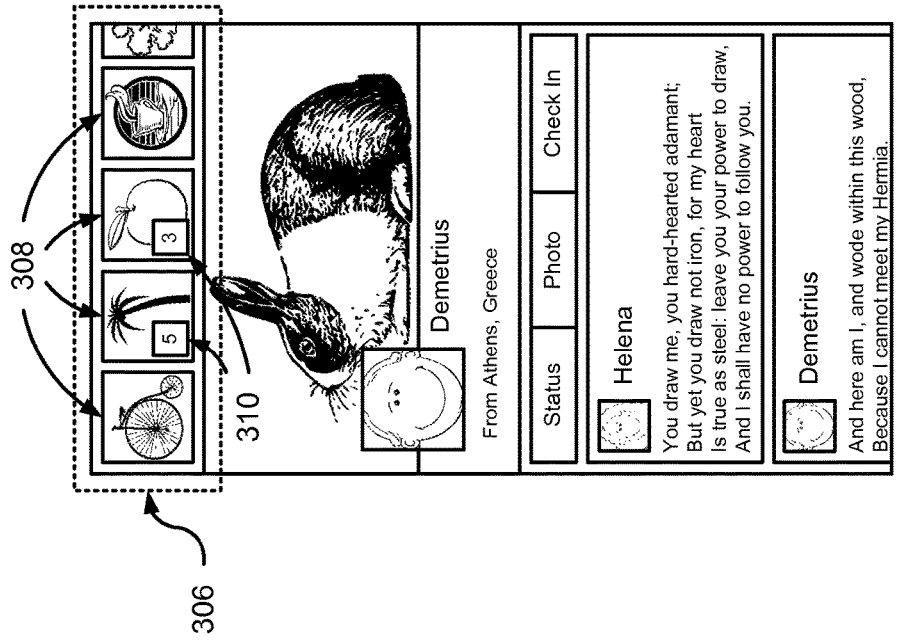
FIGS. 3A-3D are example screenshots illustrating a process for interacting with a user interface to access bookmarks, according to one embodiment.
Figure 3A:
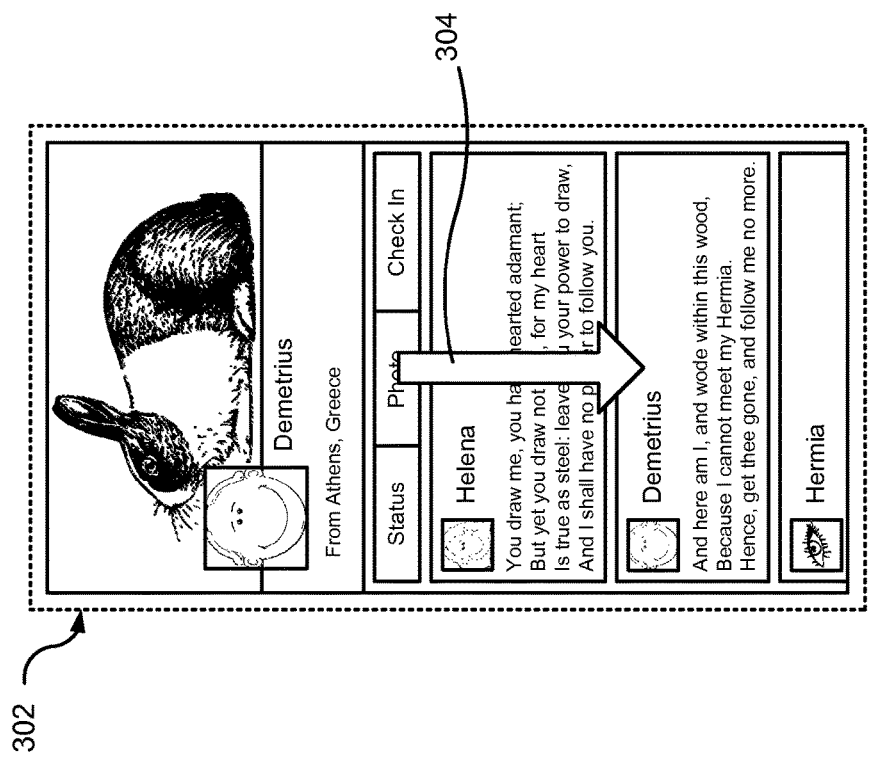
Figure 3C:
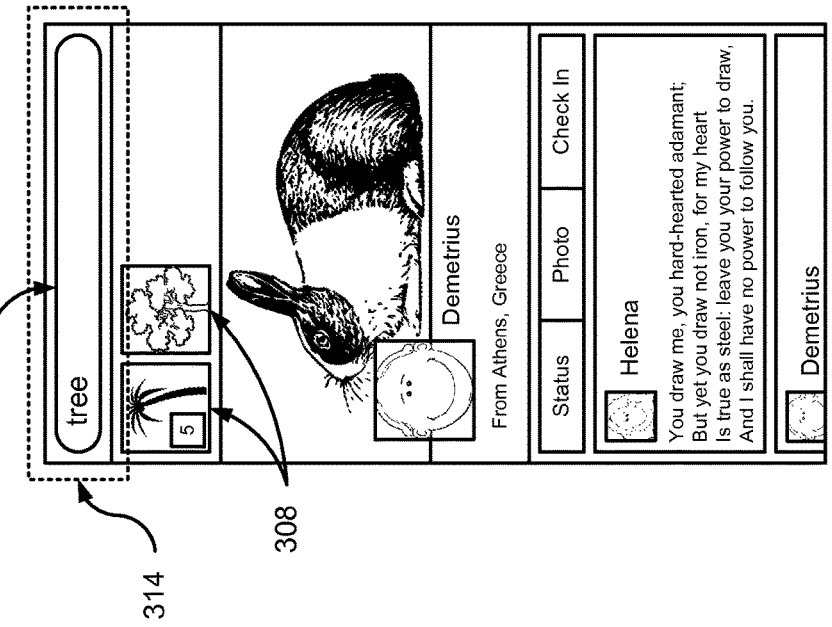

Responsive to detecting 204 the first input, the client device 102 displays 206 a modified page that includes a portion of the content of the originally displayed page as well as a tile region. In one embodiment, the tile region is displayed 206 above the portion of the content of originally displayed page, but may have any location relative to the portion of the originally displayed page in various embodiments. As shown in the example of FIG. 3B, the tile region 306 includes a plurality of horizontally arranged bookmark tiles 308. Each bookmark tile 308 includes a link to an object of the social networking system 106 capable of being rendered. For example, a bookmark tile 308 may include a link to a group, to a brand page, to a filtered news feed, or to an application. In one embodiment, the social networking application 138 receives bookmarks from the social networking system 106 and the bookmark display module 140 formats the bookmarks into bookmark tiles 308 for display to the user. In one embodiment, the tile region 306 displays bookmark tiles 308 in an order based on user interactions with the objects linked to the bookmarks corresponding to the bookmark tiles 308. For example, bookmark tiles 308 allowing access to objects with which the user has interacted with at least a threshold number of times, has interacted with using at least a threshold frequency, or with which the user has at least a threshold affinity are more prominently displayed or are presented first in the tile region 306.

Each bookmark tile 308 includes a tile image representing content associated with the object linked to the bookmark represented by the bookmark tile 308, and the bookmark display module 140 displays the tile image as part of the bookmark tile 308 to simplify user identification of the object corresponding to the bookmark tile 308. In one embodiment, the tile image is a representation of a content item that was recently associated with the linked object. For example, if the bookmark tile 308 links to a group, the tile image may be the most recent picture that was posted to the group or may be a picture posted to the group within a threshold time from the current time. In one embodiment, the bookmark display module 130 on the social networking system 106 generates the tile image by cropping, scaling, stretching, or otherwise modifying the picture, or other content item, into a size matching dimensions of the bookmark tile 308. In some embodiments, the tile image displayed in a bookmark tile 308 is updated in real-time as new content items are associated with the object linked to the bookmark represented by the bookmark tile 308. For example, if a new picture is added to a profile page, the social networking system 106 generates and sends a new tile image representing the new picture to the client device 102, which replaces a previously shown tile image with the new tile image.

In one embodiment, a bookmark tile 308 also includes a notification indicator 310 displaying a number of notifications associated with the object linked to the bookmark represented by the bookmark tile 308. The number of notifications may represent the number of content items associated with the object linked to the bookmark that the user has not yet viewed. In the embodiment shown in FIG. 3B, the notification indicator 310 is an opaque square region displayed over a portion of the tile image in a corner of the bookmark tile. In other embodiments, the notification indicator 310 may be displayed in some other manner.

The user may select any of the bookmark tiles 308 to access the corresponding object linked to the bookmark represented by a bookmark tile 308. In an embodiment where the bookmark tiles 308 are displayed on a touchscreen, the user may select a bookmark tile 308 by performing a tapping gesture on the bookmark tile 308. In another embodiment, the user selects a bookmark tile 308 by using a mouse to click on the bookmark tile 308. When a bookmark tile 308 is selected, the client device 102 displays the object linked to the bookmark corresponding to the selected bookmark tile 308 to the user.

In some embodiments, the tile region 306 may only display a subset of the bookmark tiles 308 at a time. For example, the display 134 of the client device 102 is too narrow to allow display of more than a specified number of tiles at one time. In these embodiments, the user may perform a navigation input to navigate to additional bookmark tiles 308 in the tile region 306. For example, the user performs a scrolling input (e.g., by performing a horizontal swiping gesture on a touchscreen of the client device 102). In one embodiment, the navigation input is performed within the tile region 306 to navigate between bookmark tiles 308. In response to detecting the navigation input, the bookmark display module 140 updates the tile region 306 to display a different set of bookmark tiles 308. To provide the user with additional visual feedback, the bookmark display module 140 may also display a scrolling animation. For example, if the user scrolls to the left, the bookmark display module 140 displays an animation in which the bookmark tiles move leftward.

Figure 3D:
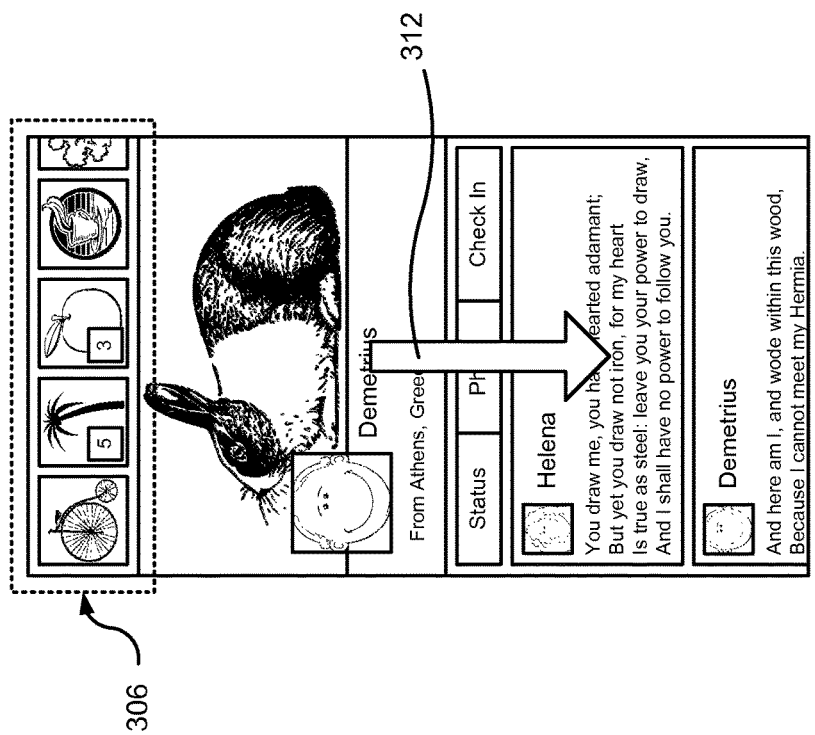

After the tile region 306 and the bookmark tiles 308 are displayed 206, the user may perform a second input, such as a second scrolling input, to access a different portion of the user interface. In one embodiment, the second input as the same type as the first input. For example, like the first input, the second input is a downward swiping gesture 304 on a touchscreen, such as the downward swipe 312 shown in FIG. 3C, or other input that is conventionally performed to move a page downward. After the client device 102 detects 208 the second input, the device 102 displays 210 a search region. As shown in FIG. 3D, the search region 314 includes a search box 316 for receiving text input from the user. When the user inputs text in the search box 316, the bookmark display module 140 updates the tile region 306 to remove bookmark tiles 308 corresponding to bookmarks that are linked to objects that do not relate to the input text from being displayed. In the example shown in FIG. 3D, the user inputs the word "tree" in the search box and tile region 306 is updated so that the bookmark tiles 308 identifying bookmarks linked to objects relating to trees are displayed, but not bookmark tiles 308 corresponding to bookmarks not linked to objects relating to trees.

In another embodiment, the bookmark display module 140 displays a different user interface feature after the client device 102 detects 208 the second input. For example, if bookmarks are divided into categories, the tile region 306 may initially display bookmark tiles 308 corresponding to bookmarks in a first category and detection of the second input causes the bookmark display module 140 to display a second tile region displaying bookmark tiles identifying bookmarks in a second category.

SUMMARY

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method comprising:

displaying, on a display screen of a client device, an application page for a social networking system, the application page including content retrieved from the social networking system;

detecting, using a processor of the client device, a first touch input to the display screen of the client device, the first touch input corresponding to a scrolling command performed by a user to the displayed application page;

responsive to detecting the first touch input, scrolling the application page downward and displaying, on the display screen of the client device, a tile region located in a space at a top of the display screen vacated by the downwardly scrolled application page;

displaying one or more bookmark tiles previously set by a user of the social networking system in the tile region, each bookmark tile represented by an image and, when selected by a user input, displays a different page in the social networking system represented by a different node in the social graph maintained by the social networking system;

detecting a second touch input to the display screen of the client device, the second touch input independent of the first touch input and detected at a different time point than when the first touch input was detected;

responsive to detecting the second touch input, scrolling the tile region and the application page downward and displaying a search region at the top of the display screen vacated by the downwardly scrolled tile region and application page;

receiving text input in the search region;

responsive to receiving the text input, updating the downwardly scrolled tile region located between the search region and the downwardly scrolled application page to include a subset of the one or more bookmark tiles, each bookmark tile in the subset linked to a page in the social networking system related to the text input;

detecting a third input selecting a bookmark tile of the subset of the one or more bookmarks; and displaying a different page within the social networking system corresponding to the selected bookmark tile.

2. The method of claim 1, further comprising:

receiving a notification that new content has been associated with a node representing a bookmark tile of the one or more bookmark tiles;

receiving an image representing the new content associated with the node; and updating the bookmark tile to display the received image.

3. The method of claim 1, wherein an order of the one or more bookmark tiles is based at least in part on interactions by the user with objects linked to each of the one or more bookmark tiles.

4. The method of claim 1, wherein a bookmark tile further displays a number representing a number of notifications associated with the object linked to the bookmark tile that the user has not viewed.

5. The method of claim 1, wherein the displayed application page includes content from a user profile associated with the user.

6. The method of claim 1, wherein the client device is a mobile device, the display screen is a touchscreen, and the first touch input is a downward swiping gesture corresponding to the scrolling command performed by the user on the touchscreen.

7. A non-transitory computer-readable medium comprising computer program code, the computer program code when executed by a processor of a client device causing the processor to perform steps including:

displaying, at the client device, an application page for a social networking system, the application page including content retrieved from the social networking system;

detecting a first touch input to a display screen of the client device, the first touch input performed by a user to the displayed page;

responsive to the first touch input, scrolling the application page downward and displaying, a tile region located in a space at a top of the display screen vacated by the downwardly scrolled application page;

displaying one or more bookmark tiles previously set by a user of the social networking system in the tile region, each bookmark tile represented by an image and, when selected by a user input, displays a different page in the social networking system represented by a different node in the social graph maintained by the social networking system;

detecting a second touch input to the display screen of the client device, the second touch input independent of the first touch input and detected at a different time point than when the first touch input was detected;

responsive to detecting the second touch input, scrolling the tile region and the application page downward and displaying a search region at the top of the display screen vacated by the downwardly scrolled tile region and application page;

receiving text input in the search region;

responsive to receiving the text input, updating the downwardly scrolled tile region located between the search region and the downwardly scrolled application page to include a subset of the one or more bookmark tiles, each bookmark tile in the subset linked to a page in the social networking system related to the text input;

detecting a third input selecting a bookmark tile of the subset of the one or more bookmarks; and displaying a different page within the social networking system corresponding to the selected bookmark tile.

8. The non-transitory computer-readable medium of claim 7, further comprising computer program code that, when executed by the processor of the client device, causes the processor to perform steps including:

receiving a notification that new content has been associated with a node representing a bookmark tile of the one or more bookmark tiles;

receiving an image representing the new content associated with the node; and updating the bookmark tile to display the received image.

9. The non-transitory computer-readable medium of claim 7, wherein an order of the one or more bookmark tiles is based at least in part on interactions by the user with objects linked to each of the one or more bookmark tiles.

10. The non-transitory computer-readable medium of claim 7, wherein a bookmark tile further displays a number representing a number of notifications associated with the object linked to the bookmark tile that the user has not viewed.

11. The non-transitory computer-readable medium of claim 7, wherein the displayed application page includes content from a user profile associated with the user.

12. The non-transitory computer-readable storage medium of claim 7, wherein the first input is a scrolling input.

13. The non-transitory computer-readable storage medium of claim 12, wherein the scrolling input is a downward swiping gesture detected by a touchscreen of the client device.

14. The method of claim 1, wherein the different page of the social networking system linked to the selected bookmark tile comprises one of a profile page, group page, brand page, or news feed.

15. The method of claim 1, wherein the third input is a touch input that is independent from both the first touch input and the second touch input and detected at a time point different from when the first touch input and second touch input were detected.

16. The non-transitory computer-readable storage medium of claim 7, wherein the third input is a touch input that is independent from both the first touch input and the second touch input and detected at a time point different from when the first touch input and second touch input were detected.

* * * * *